United States Patent
Xu et al.

(10) Patent No.: US 10,341,033 B2
(45) Date of Patent: Jul. 2, 2019

(54) SYSTEM AND METHOD FOR SECURING TRANSMIT OPPORTUNITIES FOR RF CALIBRATIONS OF WI-FI DEVICES

(71) Applicant: Futurewei Technologies, Inc., Plano, TX (US)

(72) Inventors: Zhemin Xu, San Diego, CA (US); Lars Henrik Mucke, Carlsbad, CA (US)

(73) Assignee: Futurewei Technologies, Inc., Plano, TX (US)

( * ) Notice: Subject to any disclaimer, the term of this patent is extended or adjusted under 35 U.S.C. 154(b) by 125 days.

(21) Appl. No.: 14/843,763

(22) Filed: Sep. 2, 2015

(65) Prior Publication Data

US 2017/0064703 A1 Mar. 2, 2017

(51) Int. Cl.
| H04W 72/04 | (2009.01) |
| H04B 17/11 | (2015.01) |
| H04B 17/14 | (2015.01) |
| H04B 17/18 | (2015.01) |
| H04W 84/12 | (2009.01) |

(52) U.S. Cl.
CPC ............ *H04B 17/11* (2015.01); *H04B 17/14* (2015.01); *H04B 17/18* (2015.01); *H04W 84/12* (2013.01)

(58) Field of Classification Search
None
See application file for complete search history.

(56) References Cited

U.S. PATENT DOCUMENTS

| 7,570,624 | B2 | 8/2009 | Shapira | |
| 2010/0091716 | A1* | 4/2010 | Bonta | H04W 4/20 370/329 |
| 2012/0207074 | A1 | 8/2012 | Kneckt | |
| 2014/0254647 | A1* | 9/2014 | Stott | H04L 43/50 375/224 |
| 2014/0269554 | A1* | 9/2014 | Shapira | H04B 17/0007 370/329 |
| 2014/0313986 | A1* | 10/2014 | Jeffery | H04W 74/0816 370/329 |
| 2015/0349857 | A1* | 12/2015 | Cordeiro | H04L 69/22 375/267 |

(Continued)

FOREIGN PATENT DOCUMENTS

CN 103384245 A 11/2013

OTHER PUBLICATIONS

Chousidis, C., et al., "Improving multiple broadcasting of multimedia data traffic in wireless ad-hoc networks," Science and Information Conference 2013, Oct. 7-9, 2013, pp. 822-828.

(Continued)

*Primary Examiner* — Jason E Mattis
*Assistant Examiner* — Hong Shao
(74) *Attorney, Agent, or Firm* — Conley Rose, P.C.

(57) ABSTRACT

A device is configured to perform a method for performing a radio frequency (RF) calibration of a Wi-Fi device. The method includes transmitting, by a transmitter, a CTS (clear-to-send)-to-self frame, the CTS-to-self frame having a duration field indicating a first time duration of the RF calibration. The method also includes waiting, by at least one processor, for a second time duration associated with a distributed inter-frame space (DIFS) time period. The method further includes performing, by the at least one processor, the RF calibration.

19 Claims, 5 Drawing Sheets

(56) References Cited

U.S. PATENT DOCUMENTS

| | | | | |
|---|---|---|---|---|
| 2016/0021682 A1* | 1/2016 | Wang | .................... | H04W 74/04 |
| | | | | 370/329 |
| 2016/0029389 A1* | 1/2016 | Merlin | ...................... | H04J 1/14 |
| | | | | 370/330 |
| 2016/0323915 A1* | 11/2016 | Liu | ....................... | H04W 16/14 |
| 2016/0337906 A1* | 11/2016 | Cordeiro | ............ | H04W 72/0453 |
| 2016/0345345 A1* | 11/2016 | Malik | ................... | H04W 48/04 |
| 2017/0127451 A1* | 5/2017 | Chun | ................ | H04W 74/0825 |

OTHER PUBLICATIONS

Foreign Communication from a Counterpart Application, PCT Application No. PCT/CN2015/096167, International Search Report dated Jun. 3, 2016, 7 pages.

Foreign Communication from a Counterpart Application, PCT Application No. PCT/CN2015/096167, Written Opinion dated Jun. 3, 2016, 4 pages.

* cited by examiner

SYSTEM AND METHOD FOR SECURING TRANSMIT OPPORTUNITIES FOR RF CALIBRATIONS OF WI-FI DEVICES

TECHNICAL FIELD

The present disclosure relates generally to wireless fidelity (Wi-Fi) communications, and more particularly, to a system and method for securing transmit opportunities for radio frequency (RF) calibrations of Wi-Fi devices.

BACKGROUND

Zero Intermediate Frequency (ZIF) is a widely-used RF architecture in Wi-Fi technologies including most IEEE 802.11a/b/g/n/ac technologies and some IEEE 802.11ad technologies. A device using ZIF architecture transmits particular calibration signals, which are usually not frames or signals defined by 802.11 standards, over the air in order to perform RF circuit calibrations. The calibration procedure typically lasts for a certain predetermined time period. This is also sometimes referred to as the loopback mode.

SUMMARY

According to one embodiment, there is provided a method for performing a radio frequency (RF) calibration of a Wi-Fi device. The method includes transmitting, by a transmitter, a CTS (clear-to-send)-to-self frame, the CTS-to-self frame having a duration field indicating a first time duration of the RF calibration. The method also includes waiting, by at least one processor, for a second time duration associated with a distributed inter-frame space (DIFS) time period. The method further includes performing, by the at least one processor, the RF calibration.

According to another embodiment, there is provided an apparatus for performing a RF calibration of a Wi-Fi device. The apparatus includes a transmitter and at least one processor coupled to the transmitter. The transmitter is configured to transmit a CTS-to-self frame, the CTS-to-self frame having a duration field indicating a first time duration of the RF calibration. The at least one processor is configured to wait for a second time duration associated with a DIFS time period, and perform the RF calibration.

According to yet another embodiment, there is provided a non-transitory computer readable medium embodying a computer program. The computer program includes computer readable program code for transmitting a CTS-to-self frame, the CTS-to-self frame having a duration field indicating a first time duration of the RF calibration; waiting for a second time duration associated with a DIFS time period; and performing the RF calibration.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As described above, a ZIF device may transmit calibration signals over the air (OTA) in order to perform RF circuit calibrations. There are a number of challenges with this process. One challenge is to avoid having the OTA calibration signals interfere with any adjacent or nearby devices that may be operating in the same frequency. Another challenge is to ensure that the device under calibration (DUC) can receive the calibration signals without interference from any nearby devices. The most common calibration method is to transmit calibration signals immediately when calibration is needed, without sensing or monitoring the channel. However, this method is likely to cause an OTA collision with one or more nearby devices. If a collision occurs, it can significantly degrade the calibration quality and user experience of nearby devices. Thus, it is important to substantially reduce or eliminate the chance of an OTA collision.

In many networks, Wi-Fi devices are obligated to follow certain channel access rules before transmission. These rules are known as CSMA/CA (Carrier Sense Multiple Access/Collision Avoidance) rules. Simply speaking, these rules include the rules of listening-before-talking. Similarly, a ZIF device may also be obligated to perform the calibration in accordance with the CSMA/CA rules.

To address these and other issues, the embodiments disclosed herein provide a method for Wi-Fi devices to secure a transmit opportunity to perform RF circuit calibration while satisfying CSMA/CA rules.

Figure 1:
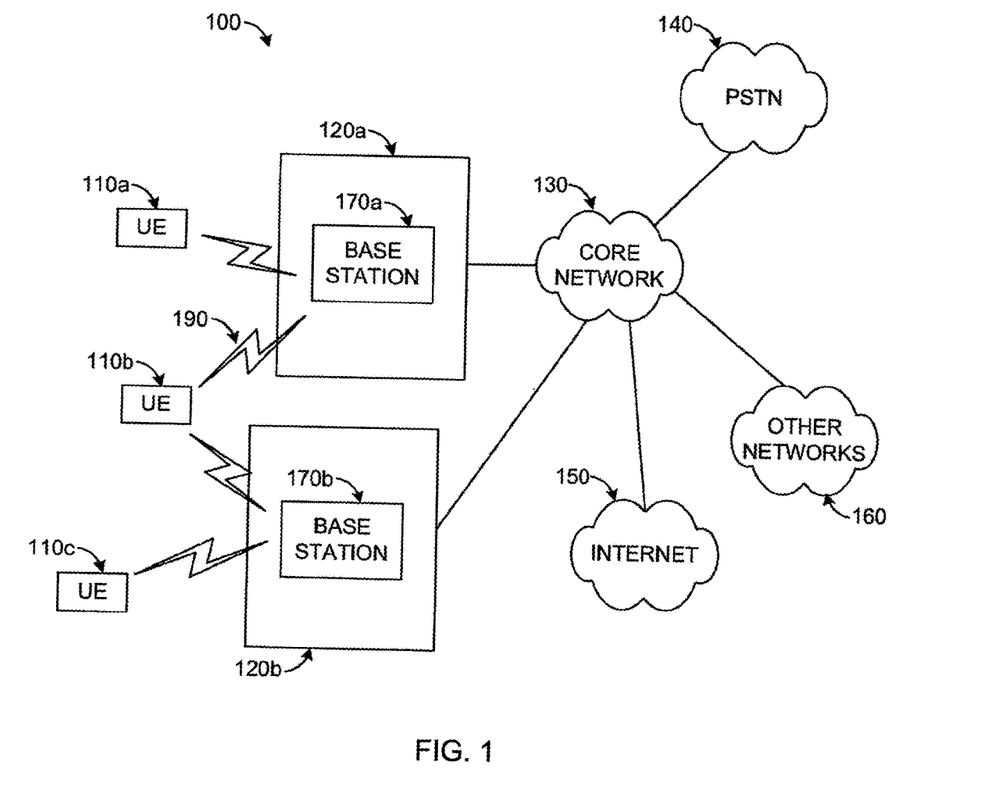
FIG. 1 illustrates an example communication system that that may be used for implementing the devices and methods disclosed herein.

FIG. 1 illustrates an example communication system 100 that may be used for implementing the devices and methods disclosed herein. In general, the system 100 enables multiple wireless users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) for wireless links such as communication links 190. In some embodiments, the system 100 may represent a Wi-Fi network or system.

In this example, the communication system 100 includes user equipment (UE) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100. In some embodiments, only wireline networking links are used.

The UEs 110*a*-110*c* are configured to operate and/or communicate in the system 100. For example, the UEs 110*a*-110*c* are configured to transmit and/or receive wireless signals or wired signals. Each UE 110*a*-110*c* represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 120*a*-120*b* here include base stations 170*a*-170*b*, respectively. Each base station 170*a*-170*b* is configured to wirelessly interface with one or more of the UEs 110*a*-110*c* to enable access to the core network 130, the PSTN 140, the Internet 150, and/or the other networks 160. For example, the base stations 170*a*-170*b* may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router, or a server, router, switch, or other processing entity with a wired or wireless network.

In the embodiment shown in FIG. 1, the base station 170*a* forms part of the RAN 120*a*, which may include other base stations, elements, and/or devices. Also, the base station 170*b* forms part of the RAN 120*b*, which may include other base stations, elements, and/or devices. Each base station 170*a*-170*b* operates to transmit and/or receive wireless signals within a particular geographic region or area, sometimes referred to as a "cell." In some embodiments, multiple-input multiple-output (MIMO) technology may be employed having multiple transceivers for each cell.

The base stations 170*a*-170*b* communicate with one or more of the UEs 110*a*-110*c* over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and UEs may implement LTE, LTE-A, and/or LTE-B. Of course, other multiple access schemes and wireless protocols may be utilized.

The RANs 120*a*-120*b* are in communication with the core network 130 to provide the UEs 110*a*-110*c* with voice, data, application, Voice over Internet Protocol (VoIP), or other services. Understandably, the RANs 120*a*-120*b* and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110*a*-110*c* may include functionality for communicating with different wireless networks over different wireless links using different wireless technologies and/or protocols.

Although FIG. 1 illustrates one example of a communication system, various changes may be made to FIG. 1. For example, the communication system 100 could include any number of UEs, base stations, networks, or other components in any suitable configuration.

Figure 2A:
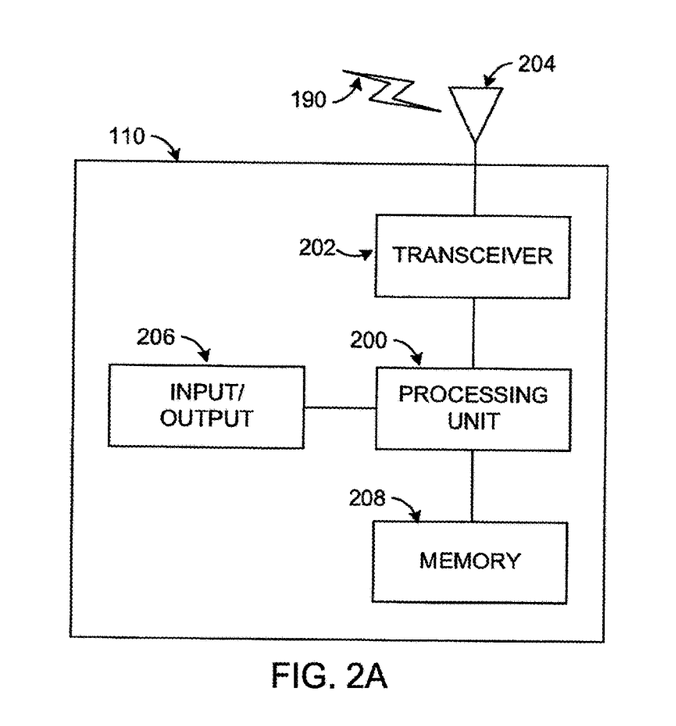
FIGS. 2A and 2B illustrate example devices that may implement the methods and teachings according to this disclosure.
Figure 2B:
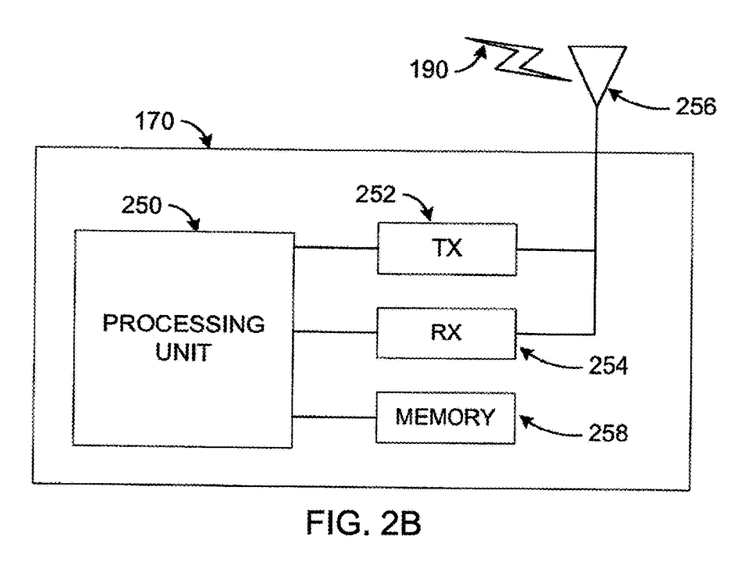

FIGS. 2A and 2B illustrate example devices that may implement the methods and teachings according to this disclosure. In particular, FIG. 2A illustrates an example UE 110 and FIG. 2B illustrates an example base station 170. These devices could be used in the system 100, or in any other suitable system. In particular, one or both of these devices could be Wi-Fi devices configured for securing one or more transmit opportunities for RF calibration, as described herein.

As shown in FIG. 2A, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the system 100. The processing unit 200 also supports the methods and teachings described in more detail above. Each processing unit 200 includes any suitable processing or computing device configured to perform one or more operations. One or more processing units 200 could, for example, include a microprocessor, microcontroller, digital signal processor, field programmable gate array, system on chip (SoC), or application specific integrated circuit.

The UE 110 also includes at least one transceiver 202. The transceiver 202 is configured to modulate data or other content for transmission by at least one antenna 204. The transceiver 202 is also configured to demodulate data or other content received by the at least one antenna 204. Each transceiver 202 includes any suitable structure for generating signals for wireless transmission and/or processing signals received wirelessly. Each antenna 204 includes any suitable structure for transmitting and/or receiving wireless signals. One or multiple transceivers 202 could be used in the UE 110, and one or multiple antennas 204 could be used in the UE 110. Although shown as a single functional unit, a transceiver 202 could also be implemented using at least one transmitter and at least one separate receiver.

The UE 110 further includes one or more input/output devices 206. The input/output devices 206 facilitate interaction with a user. Each input/output device 206 includes any suitable structure for providing information to or receiving information from a user, such as a speaker, microphone, keypad, keyboard, display, or touch screen.

In addition, the UE 110 includes at least one memory 208. The memory 208 stores instructions and data used, generated, or collected by the UE 110. For example, the memory 208 could store software or firmware instructions executed by the processing unit(s) 200 and data used by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, and at least one memory 258. The processing unit 250 implements various processing operations of the base station 170, such as signal coding, data processing, power control, input/output processing, or any other functionality. The processing unit 250 can also support the methods and teachings described in more detail above. Each processing unit 250 includes any suitable processing or computing device configured to perform one or more operations. One or more processing units 250 could, for example, include a microprocessor, microcontroller, digital signal processor, field programmable gate array, system on chip (SoC), or application specific integrated circuit.

Each transmitter 252 includes any suitable structure for generating signals for wireless transmission to one or more UEs or other devices. Each receiver 254 includes any suitable structure for processing signals received wirelessly from one or more UEs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

Additional details regarding the UEs 110 and the base stations 170 are known to those of skill in the art. As such, these details are omitted here. It should be appreciated that the devices illustrated in FIGS. 2A and 2B are merely examples, and are not intended to be limiting. Various embodiments of this disclosure may be implemented using one or more computing devices that include the components of the UEs 110 and base stations 170, or which include an alternate combination of components, including components that are not shown in FIGS. 2A and 2B. For example, various embodiments of this disclosure may be implemented using a multi-processor computer, a plurality of single and/or multiprocessor computers arranged into a network, or some combination of both.

Figure 3:
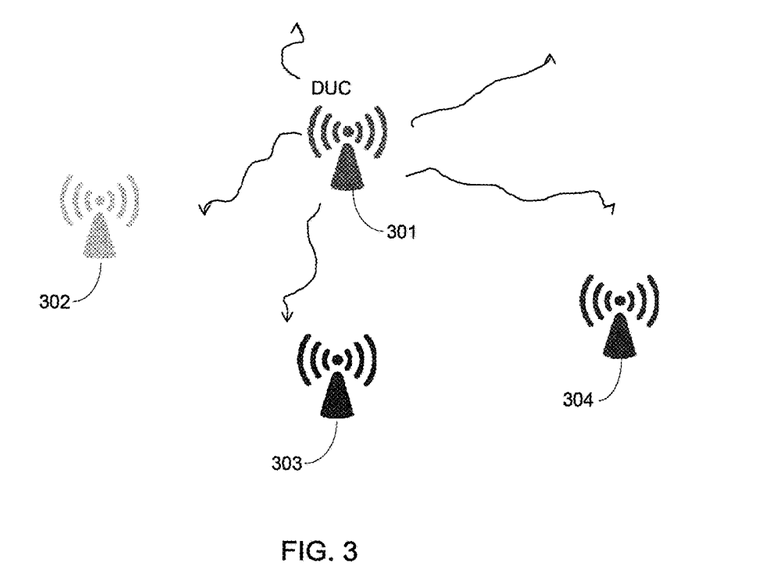
FIG. 3 illustrates an example Wi-Fi network according to this disclosure.

FIG. 3 illustrates an example Wi-Fi network according to this disclosure. The Wi-Fi network 300 may represent (or be represented by) the communication system 100 of FIG. 1. The Wi-Fi network 300 includes a plurality of Wi-Fi devices 301-304. Each of the Wi-Fi devices 301-304 may represent (or be represented by) the UE 110 of FIG. 2A or the base station 170 of FIG. 2B. Each device 301-304 is configured to communicate over the Wi-Fi network 300 with one or more other devices 301-304. Although the Wi-Fi network 300 is depicted in FIG. 3 with four Wi-Fi devices, this is merely one example. In other embodiments, the Wi-Fi network 300 could have more or fewer devices.

In some embodiments, the Wi-Fi devices 301-304 may communicate according to Zero Intermediate Frequency (ZIF) principles. At certain times, one of the Wi-Fi devices (e.g., the Wi-Fi device 301) may need to perform a RF circuit calibration. During the calibration period, the Wi-Fi device 301 may be referred to as a device under calibration (DUC). In accordance with this disclosure, the DUC 301 may use a CTS (Clear to Send)-to-self frame to secure the transmit opportunity for the calibration. The CTS-to-self frame disclosed herein is based on a standard CTS-to-self frame type, which is a defined MAC frame type, as known in the art. In some embodiments, the CTS-to-self frame may be a Directional Multigigabit (DMG) CTS-to-self frame, as described in greater detail below.

Figure 4A:
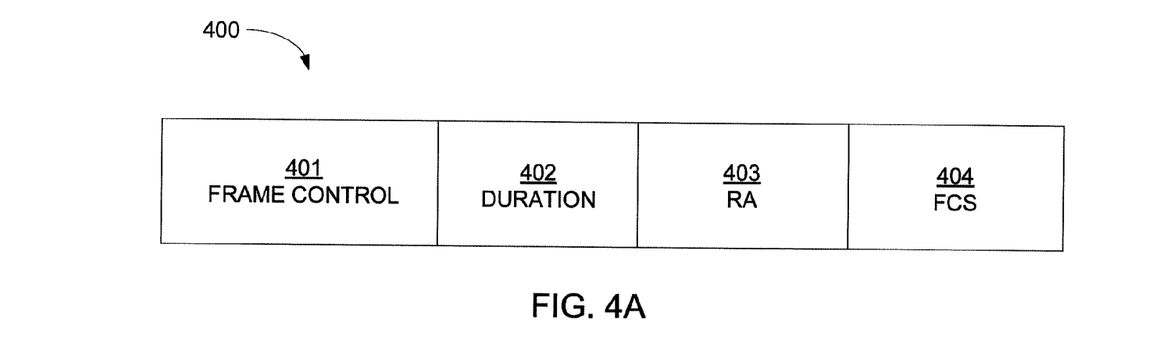
FIGS. 4A and 4B illustrate example frame formats of a CTS-to-self frame according to this disclosure.
Figure 4B:
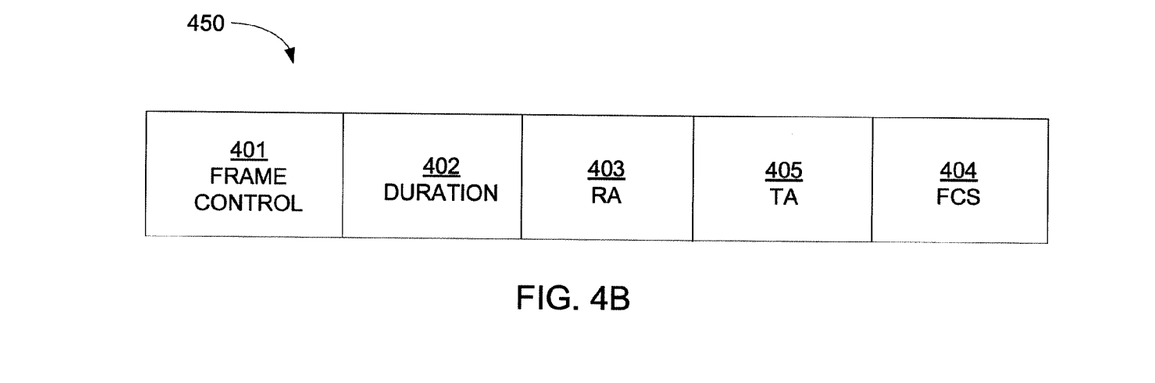

FIGS. 4A and 4B illustrate example frame formats of a CTS-to-self frame according to this disclosure. Like a CTS-to-self frame defined in the 802.11 Wi-Fi standards, the CTS-to-self frame 400 includes a frame control field 401, a duration field 402, a receiver address (RA) field 403, and a frame check sequence (FCS) field 404. The DMG CTS-to-self frame 450 is analogous to a DMG CTS-to-self frame defined in the 802.11 ad Wi-Fi standards. The DMG CTS-to-self frame 450 includes a frame control field 401, a duration field 402, a receiver address (RA) field 403, and a frame check sequence (FCS) field 404, and further includes a transmitter address (TA) field 405.

The frame control field 401 and the FCS field 404 are programmed according to the Wi-Fi standards. Likewise, the RA field 403 is populated with the DUC's own MAC address, per the Wi-Fi standards.

The duration field 402 is populated with a value that represents the duration of the RF calibration performed by the DUC 301. For example, if the RF calibration is expected to take 2 msec, then the value of duration field 402 is 2 msec. Of course, 2 msec is merely one example. Other calibrations can take a shorter or longer period of time. In general, the duration time may be vendor specific and may depend on the model or type of the DUC 301, or on the number of calibration steps that are to be performed.

Figure 5:
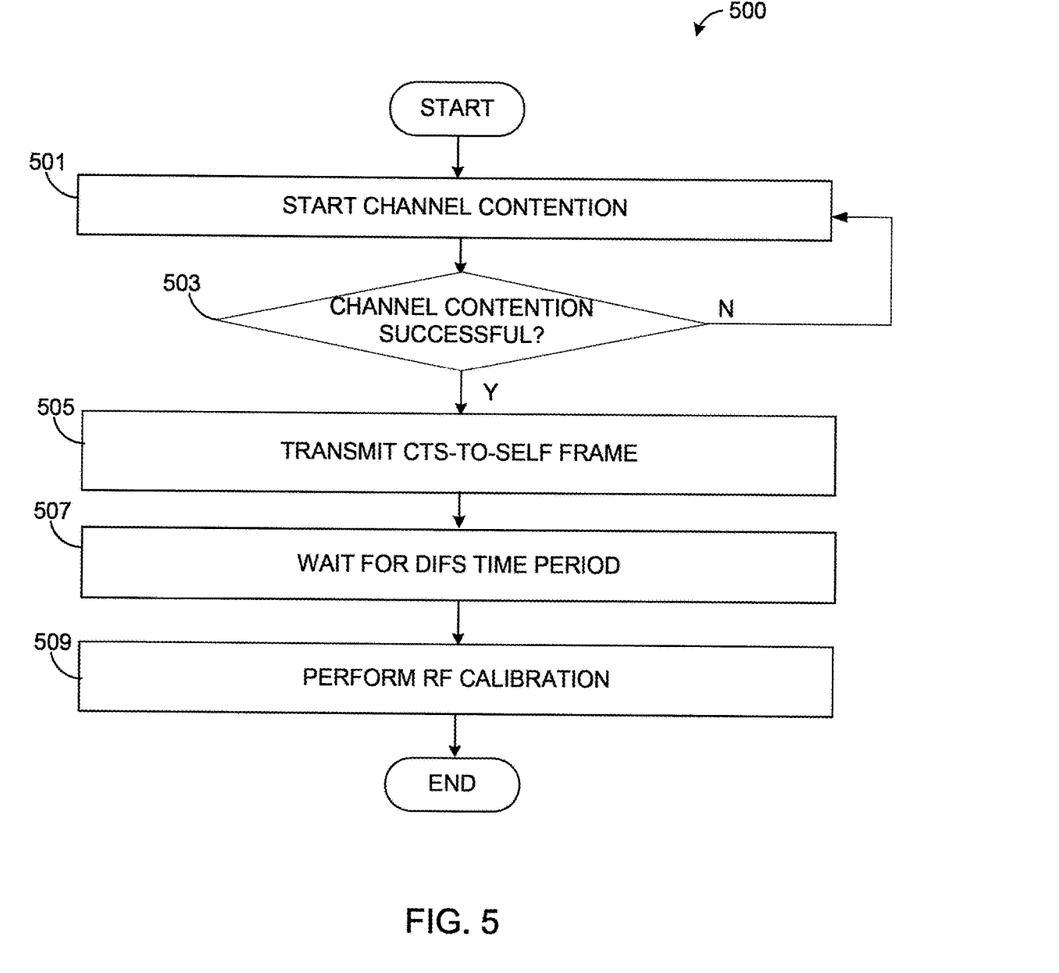
FIG. 5 illustrates an example method for performing a RF calibration of a Wi-Fi device, according to this disclosure.

FIG. 5 illustrates an example method for performing a RF calibration of a Wi-Fi device, according to this disclosure. The method 500 may be performed in conjunction with the Wi-Fi network 300 of FIG. 3. For example, one or more operations of the method 500 may be performed by the DUC 301. However, the method 500 could also be used with any other suitable device or system.

At operation 501, the DUC starts channel contention. This may include the DUC selecting a random backoff integer b and counting down b slots before attempting to transmit.

At operation 503, the DUC determines if the channel contention is successful. This may include the DUC listening for transmissions from nearby devices during the random backoff countdown. If it is determined that the channel contention is not successful (e.g., the DUC detects at least one transmission from one or more nearby devices during the random backoff countdown and is thus not able to secure a transmit opportunity), the DUC keeps silent until the winning device completes its transmission. Then the method 500 returns to operation 501, where the DUC restarts channel contention. Alternatively, if it is determined that the channel contention is successful (e.g., the DUC detects no transmission during the random backoff countdown), the method proceeds to operation 505.

At operation 505, the DUC transmits a CTS-to-self frame. The CTS-to-self frame is broadcast and may be received by one or more nearby devices. The CTS-to-self frame is configured with a duration field value set to be the expected duration time period of the RF calibration. In some embodiments, the duration time period may be vendor specific and may be based on the model or type of the DUC 301, or on the number of calibration steps that are to be performed in the RF calibration. In some embodiments, the CTS-to-self frame may be a DMG CTS-to-self frame.

In some embodiments, the DUC and other Wi-Fi devices in the network operate in multiple 20 MHz bands, such as permitted in IEEE 802.11ac. In such an embodiment, the DUC transmits multiple CTS-to-self frames, where each CTS-to-self frame is transmitted in one of the 20 MHz bands. The multiple CTS-to-self frames are transmitted simultaneously.

At operation 507, the DUC waits for a time period equal in duration to a distributed inter-frame space (DIFS). The wait time period follows the completion of the CTS-to-self frame transmission to ensure that nearby devices correctly receive the CTS-to-self frame.

At operation 509, the DUC performs the RF calibration. This may include the DUC performing the RF calibration for a duration that is associated with the duration value in the duration field of the CTS-to-self frame. During the duration period, one or more nearby devices that receive the CTS-to-self frame remain silent for the duration period. This silence protocol is known as virtual clear channel assessment (V-CCA). Because of the transmission of the CTS-toself frame and the following silent period, the DUC can perform the RF calibration without concern about an OTA collision.

Figure 6:
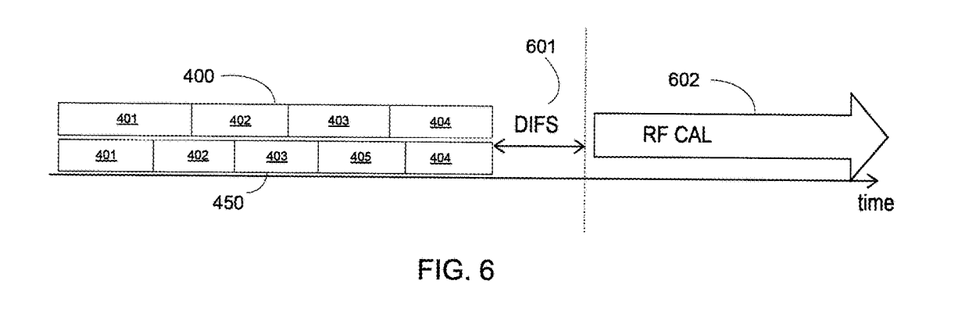
FIG. 6 illustrates an example timeline associated with the RF calibration method of FIG. 5.

FIG. 6 illustrates an example timeline associated with the RF calibration method 500. As shown in FIG. 6, the DUC transmits a CTS-to-self frame 400 or a DMG CTS-to-self frame 450, then waits for a DIFS time period 601, then performs the RF calibration 602 at the end of the DIFS time period 601.

The use of a CTS-to-self frame (or DMG CTS-to-self frame) in the method 500 is superior to a number of alternatives, including use of RTS/CTS (Request to Send/Clear to Send) frames. For example, a RTS frame is a unicast frame. Transmission of a unicast frame requires that the transmitter have knowledge of the MAC address of each nearby device that is to receive the unicast transmission. However, a DUC attempting to perform a RF calibration typically does not have this knowledge at the time of the RF calibration. In general, RF calibration can happen in either of two scenarios: 1) At the device power-up stage, and 2) in periodic calibration during operation of the device. When the DUC powers up, it has not communicated with any other devices in the network; thus the DUC has no knowledge of MAC address of peer devices at power up. Similarly, device periodic calibration is performed only for the benefit of the DUC itself. Calibration does not involve any other peer device in the network. It is therefore inappropriate to send a unicast RTS frame during a periodic calibration.

Although FIG. 5 illustrates one example of a method 500 for performing a RF calibration of a Wi-Fi device, various changes may be made to FIG. 5. For example, while shown as a series of steps, various steps shown in FIG. 5 could overlap, occur in parallel, occur in a different order, or occur multiple times. Moreover, some steps could be combined or removed and additional steps could be added according to particular needs.

As described herein, embodiments of this disclosure provide a method for securing a transmit opportunity for device RF calibrations that require OTA transmissions, while conforming to Wi-Fi standards. This method is superior to a brute force approach to calibration, in which calibration signals are transmitted without regard to the high risk of OTA collisions with nearby devices. The disclosed embodiments make use of a CTS-to-self frame for the RF calibration. The RF calibration can be performed both at device power-up and periodically during operation. Using the disclosed embodiments, the RF calibration can be carried out without worrying about OTA collisions.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for performing a radio frequency (RF) calibration of a wireless fidelity (Wi-Fi) device that operates in multiple bands, the method comprising:
   transmitting, by a transmitter, a plurality of CTS (clear-to-send)-to-self frames, where each CTS-to-self frame in the plurality of CTS-to-self frames has a duration field indicating a first time duration of the RF calibration;
   waiting, by at least one processor, after transmitting the plurality of CTS-to-self frames for a second time duration associated with a distributed inter-frame space (DIFS) time period; and
   performing, by the at least one processor, the RF calibration for the first time duration indicated in the duration field after waiting for the second time duration associated with the DIFS time period, wherein the first time duration is dependent upon a model of the Wi-Fi device.

2. The method of claim 1, further comprising:
   before transmitting the plurality of CTS-to-self frames, performing a channel contention by the at least one processor.

3. The method of claim 2, wherein performing the channel contention comprises selecting a random backoff integer b and counting down b slots.

4. The method of claim 2, further comprising:
   when the channel contention is not successful, remaining silent until a second device that wins the channel contention completes its transmissions; and
   repeating the performing of the channel contention.

5. The method of claim 1, wherein the RF calibration is performed periodically during normal operation.

6. The method of claim 1, wherein the Wi-Fi device operates in multiple 20MHz bands.

7. The method of claim 1, wherein each CTS-to-self frame comprises a Directional Multigigabit (DMG) CTS-to-self frame.

8. An apparatus for performing a radio frequency (RF) calibration of a wireless fidelity (Wi-Fi) device that operates in multiple bands, the apparatus comprising:
- a transmitter configured to transmit a plurality of CTS (clear-to-send)-to-self frames, where each CTS-to-self frame having a duration field indicating a first time duration of the RF calibration, wherein the first time duration is dependent upon a model of the Wi-Fi device; and
- at least one processor coupled to the transmitter, the at least one processor configured to control the Wi-Fi device to:
  - wait for a second time duration associated with a distributed inter-frame space (DIFS) time period after transmitting the plurality of CTS-to-self frames; and
  - perform the RF calibration of the Wi-Fi device after waiting for the second time duration associated with the DIFS time period.

9. The apparatus of claim 8, wherein the at least one processor is configured to control the Wi-Fi device to perform the RF calibration for the first time duration indicated in the duration field in each of the CTS-to-self frames.

10. The apparatus of claim 8, wherein the at least one processor is further configured to control the Wi-Fi device to:
- before the transmitting of the plurality of CTS-to-self frames, perform a channel contention.

11. The apparatus of claim 10, wherein the at least one processor is configured to control the Wi-Fi device to perform the channel contention by selecting a random backoff integer b and counting down b slots.

12. The apparatus of claim 10, wherein the at least one processor is further configured, when the channel contention is not successful, to control the Wi-Fi device to:
- remain silent until a second device that wins the channel contention completes its transmissions; and
- repeat the performing of the channel contention.

13. The apparatus of claim 8, wherein the at least one processor is configured to control the Wi-Fi device to perform the RF calibration periodically during normal operation.

14. The apparatus of claim 8, wherein the Wi-Fi device operates in multiple 20MHz bands.

15. The apparatus of claim 8, wherein each CTS-to-self frame comprises a Directional Multigigabit (DMG) CTS-to-self frame.

16. A non-transitory computer readable medium embodying a computer program, the computer program comprising computer readable program code for:
- transmitting a plurality of CTS (clear-to-send)-to-self frames, where each CTS-to-self frame having a duration field indicating a first time duration of a radio frequency (RF) calibration, wherein the first time duration is dependent upon a model of a wireless fidelity (Wi-Fi) device to be calibrated;
- waiting for a second time duration associated with a distributed inter-frame space (DIFS) time period after transmitting the plurality of CTS-to-self frames; and
- performing the RF calibration of the Wi-Fi device after waiting for the second time duration associated with the DIFS period.

17. The non-transitory computer readable medium of claim 16, wherein performing the RF calibration comprises performing the RF calibration for the first time duration indicated in the duration field in each of the CTS-to-self frames.

18. The non-transitory computer readable medium of claim 16, the computer program further comprising computer readable program code for:
- before transmitting the plurality of CTS-to-self frames, performing a channel contention.

19. The non-transitory computer readable medium of claim 18, wherein performing the channel contention comprises selecting a random backoff integer b and counting down b slots.

* * * * *